United States Patent [19]

Pommerening et al.

[11] 3,904,831

[45] Sept. 9, 1975

[54] TONE CONTROL ARRANGEMENT FOR ELECTRONIC PABX

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: Jan. 9, 1974

[21] Appl. No.: 431,885

[52] U.S. Cl. ...... 179/18 GF; 179/18 AD; 179/84 A

[51] Int. Cl.$^2$ .......................................... H04Q 1/44

[58] Field of Search ......... 179/18 H, 18 HB, 18 GF, 179/18 GE, 22, 84 A, 84 R, 18 AD, 99, 18 E

[56] References Cited

UNITED STATES PATENTS

| | | | |
|---|---|---|---|
| 2,846,513 | 8/1958 | Van Mierlo et al. | 179/84 A |
| 2,871,299 | 1/1959 | Nilsson et al. | 179/22 |
| 3,542,960 | 11/1970 | Schneider | 179/18 E |
| 3,729,594 | 4/1973 | Krock et al. | 179/18 AB |

*Primary Examiner*—Thomas W. Brown
*Attorney, Agent, or Firm*—Donald R. Antonelli; William F. Porter, Jr.

[57] ABSTRACT

A tone control arrangement for an electronic telephone system wherein a plurality of tone generators are selectively connected to respective line circuits via a tone matrix under control of a common control. The tone matrix includes a plurality of cross points which are sequentially scanned and the common control includes matrix control means for selectively actuating cross points of the tone matrix as they are being scanned.

12 Claims, 11 Drawing Figures

TONE CONTROL ARRANGEMENT FOR ELECTRONIC PABX

The present invention relates in general to telephone systems, and more particularly to a tone control arrangement for an electronic telephone exchange.

Advances in solid state techniques have made possible the reduction in size of electronic equipment while increasing the reliability and the speed of operation thereof. In the telephone industry, as in other industries, efforts have been made to reduce the quantity and size of equipment required for telephone exchanges by time-sharing equipment to the extent permitted by traffic requirements and by providing novel connection systems whereby the use of a smaller number of circuits is made possible.

In all telephone systems, it is necessary to apply various tones to the subscriber, such as dial tone and busy tone, to indicate to the subscriber various conditions of the call. Dial tone is normally provided from the tone generator through relay contacts in the junctor circuit connected through the switching matrix to the calling line circuit, and the application of a busy tone further requires the use of interrupter circuits to implement tone interruption. The provision of special switching circuits for application of tones to the line circuits as well as the requirement for interrupter circuits to provide for tone interruption increases the cost and complexity of the telephone exchange. In addition, the requirement for use of relay-type switches for application of tone signals to the line circuits also places a restriction on the speed of operation of the system.

It is therefore an object of the present invention to provide a tone-generating arrangement for an electronic telephone system which is simpler and more compact than standard tone generating arrangements presently in use.

It is a further object of the present invention to provide a tone generating arrangement for an electronic telephone system which utilizes solid-state components having high speeds of operation for applications of tones through the junctor circuits.

It is another object of the present invention to provide a tone generating arrangement for an electronic telephone system which makes possible the elimination of presently used tone interrupter circuits, thereby providing a simplified and inexpensive arrangement for generation and application of tones to the line circuits.

BRIEF DESCRIPTION OF THE INVENTION

The present invention is particularly directed to use of a rectangular solid-state switching matrix as a tone matrix having appearances for connection to a dial tone, ring-back tone, busy tone and other tone sources along one side thereof and a junctor appearance for connection through the junctors to the primary switching network along the other coordinate side thereof. The tone generating arrangement of the present invention consists of solid state cross points in the tone switching matrix which can connect the tone generators to tone couplers into the junctor circuits.

Tone interruption is implemented by turning on and off the cross points of the tone matrix, making unnecessary additional switching circuits which normally would be provided for such tone interruption. When all cross points associated with a tone coupler are off, the tone coupler automatically disconnects the talking path from the bias supply required by the tone cross point for linear operation. The resulting isolation approximates that a relay contact. The solid state interruption which is provided by the tone matrix permits a common tone source to be used for different call progress signals.

The attenuation which is provided by the tone coupler, in combination with the low output impedance of the tone generators, provides good isolation of the junctor talking paths. The attenuation of a tone provided by the tone coupler is defined by fixed resistors rather than reactive elements, in accordance with the present invention.

These and other features, objects and advantages of the present invention will become clear from the following detailed description of a preferred embodiment of the present invention presented in connection with the accompanying drawings, wherein:

FIGS. 1*a* and 1*b*, in combination, form a schematic block diagram of the electronic private automatic branch exchange of the present invention;

PREFERRED EMBODIMENT OF THE INVENTION

A basic element of the tone generating arrangement of the present invention is a tone matrix formed by integrated circuit techniques of a plurality of solid state cross point switches of the type disclosed in copending U.S. application Ser. No. 232,031, filed Mar. 6, 1972, now U.S. Pat. No. 3,789,151, in the name of Glenn L. Richards. The matrix serves to establish a low impedance electrical path for passing tone signals between a selected one of a plurality of tone generators and a selected one of a plurality of junctor circuits.

Figure 1A:
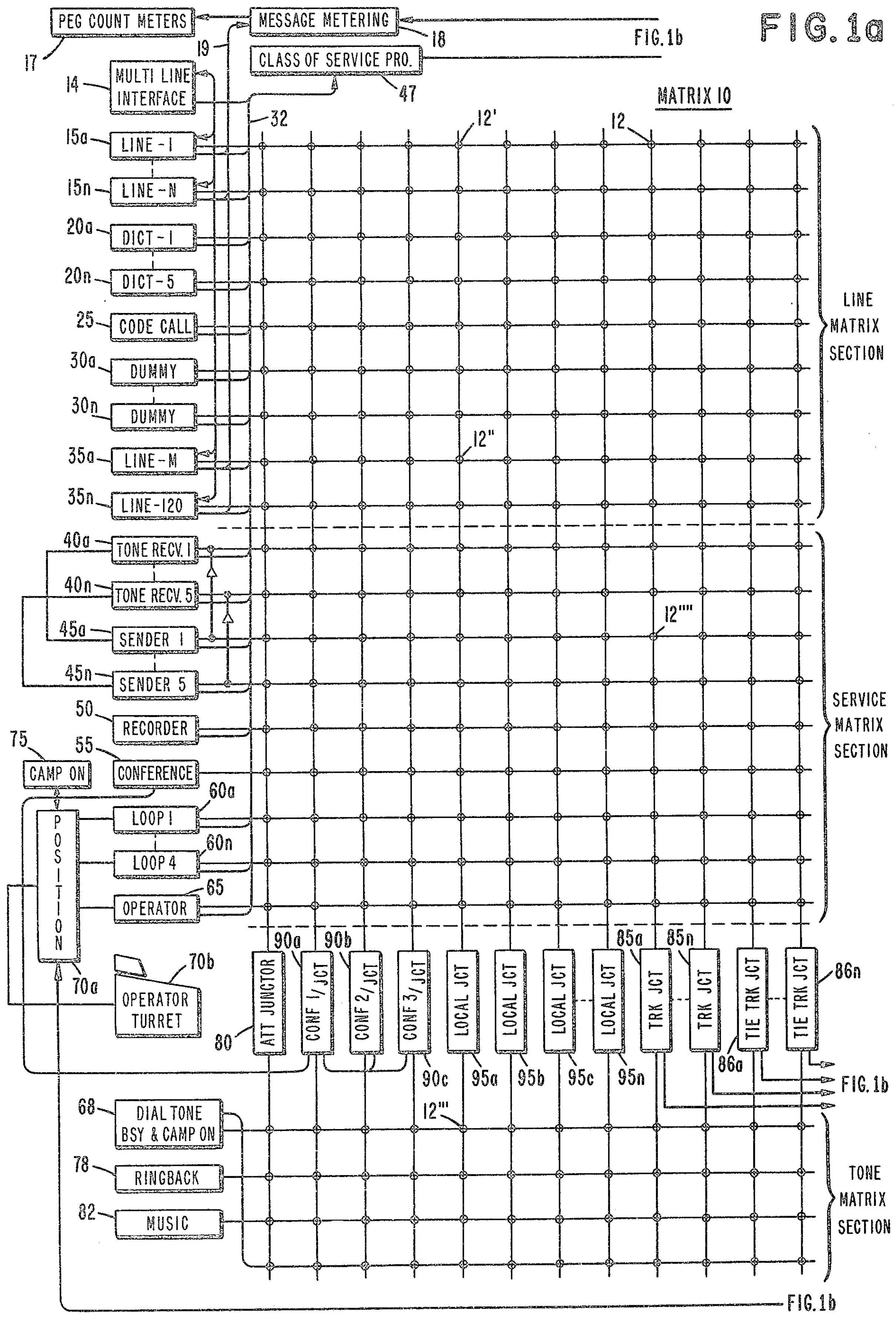
Figure 1B:
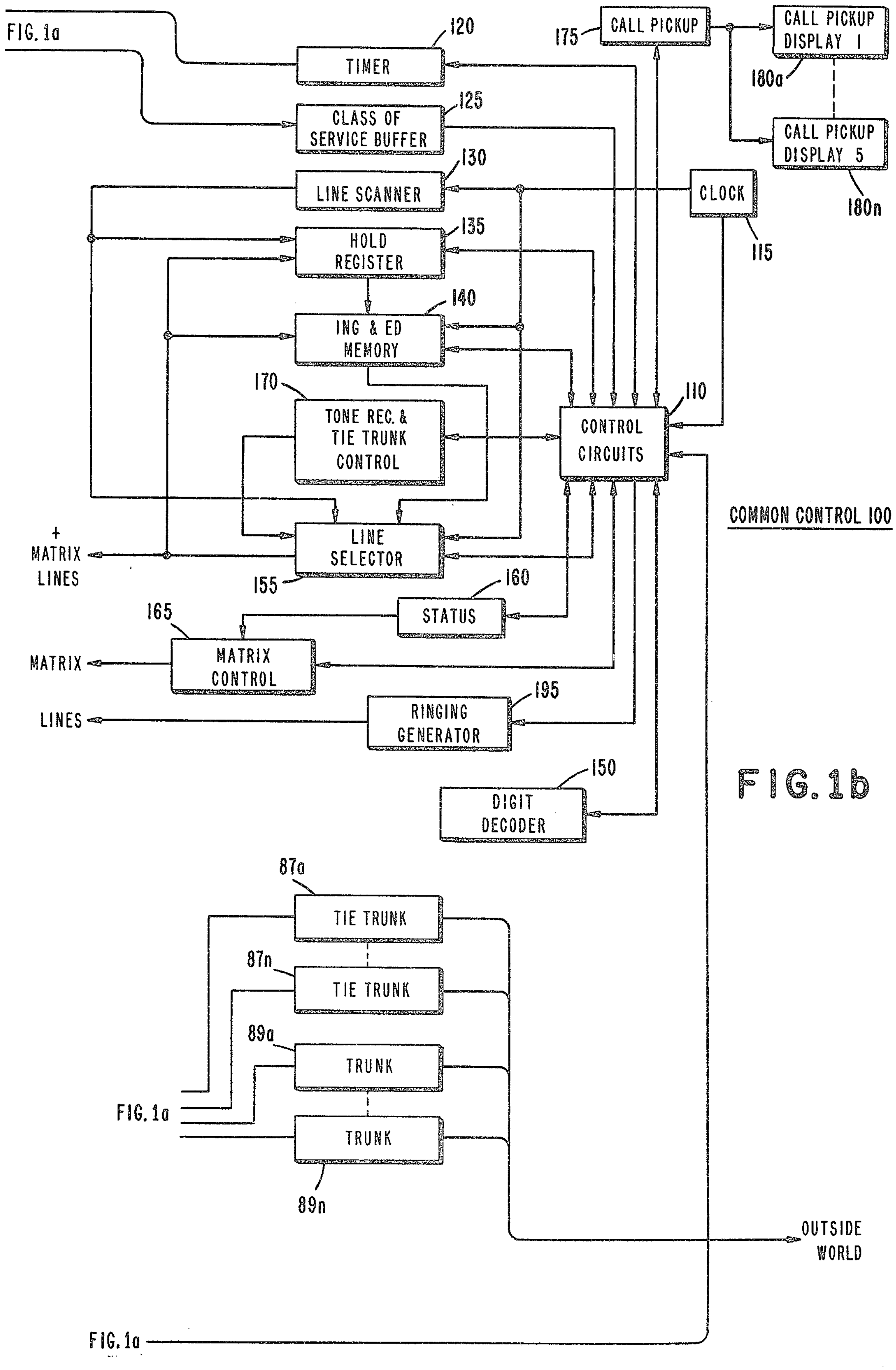

While the present invention has general application to telephone systems, a preferred embodiment will be described in connection with the electronic private automatic branch exchange disclosed in our copending application Ser. No. 431,928, filed Jan. 9, 1974, and assigned to the same assignee as the present application. FIG. 1 illustrates the general block diagram of the PABX, which includes a space divided rectangular solid state switching matrix 10 in the form of a single stage rectangular array of cross points divided into three sections, i.e., a line matrix section, a service matrix section, and the tone matrix section of the present invention.

Line appearances are provided on the left side of the line matrix section, as seen in FIG. 1, including a plurality of line circuits 15*a* through 15*n* and 35*a* through 35*n*. Between the line circuits there are provided connections to special lines which take the place of regular lines in the system. These special lines are dictation access circuits 20$a$ through 20$n$, a code call circuit 25 and a plurality of dummy line tie trunks 30$a$ through 30$n$.

Line appearances at the service matrix section take the form of a plurality of tone receivers 40$a$ through 40$n$, a plurality of register senders 45$a$ through 45$n$, an intercept recorder 50, a conference bridge 55, a plurality of operator loop circuits 60$a$ through 60$n$ and an operator line circuit 65. The number of tone receivers, register senders and operator loop circuits, like the number of line circuits connected to the line appearance inputs of the matrix 10 depend upon the traffic requirements and size of the system.

The outputs of the matrix 10 are provided in the form of a plurality of junctor appearances, as seen in FIG. 1. The junctor appearances are associated with an attendant's junctor 80, a plurality of conference junctors 90$a$ through 90$c$, a plurality of local junctors 95$a$ through 95$n$, a plurality of trunk junctors 85a through 85$n$ and a plurality of tie trunk junctors 86a through 86n The trunk junctors 85$a$ through 85$n$ are connected to corresponding trunks 89$a$ through 89$n$, and the tie trunk junctors 86$a$ through 86$n$ are associated with corresponding tie trunks 87$a$ through 87$n$.

The tone matrix section of the matrix 10 provides inputs on respective lines from a combined dial tone generator and busycamp on tone generator 68, along with inputs from a ring-back tone generator 78 and music source 82. The outputs of the tone matrix section are connected through the respective junctors to the junctor appearances of the line and service matrix sections of the matrix 10, as will be described in greater detail hereinafter.

The operator complex includes in addition to the loop circuits 60$a$ through 60$n$ and the operator line circuit 65, an operator position circuit 70$a$ to which is connected an operator turret 70$b$. A camp on circuit 75 providing a special feature in the system is also connected to the operator position circuit 70$a$. As another special feature of the system, a message metering circuit 18 and one or more peg count meters 17 are associated with the line circuits via a bus 19.

The matrix 10 functions to selectively connect an input from a line to a selected junctor by closing the appropriate cross point and to provide an appropriate tone through the selected junctor to the line by closing the appropriate cross point in the tone matrix section. Connection from one line to another line is also effected by closing the pair of cross points in the line matrix section associated with the respective lines and a common junctor.

Figure 2:
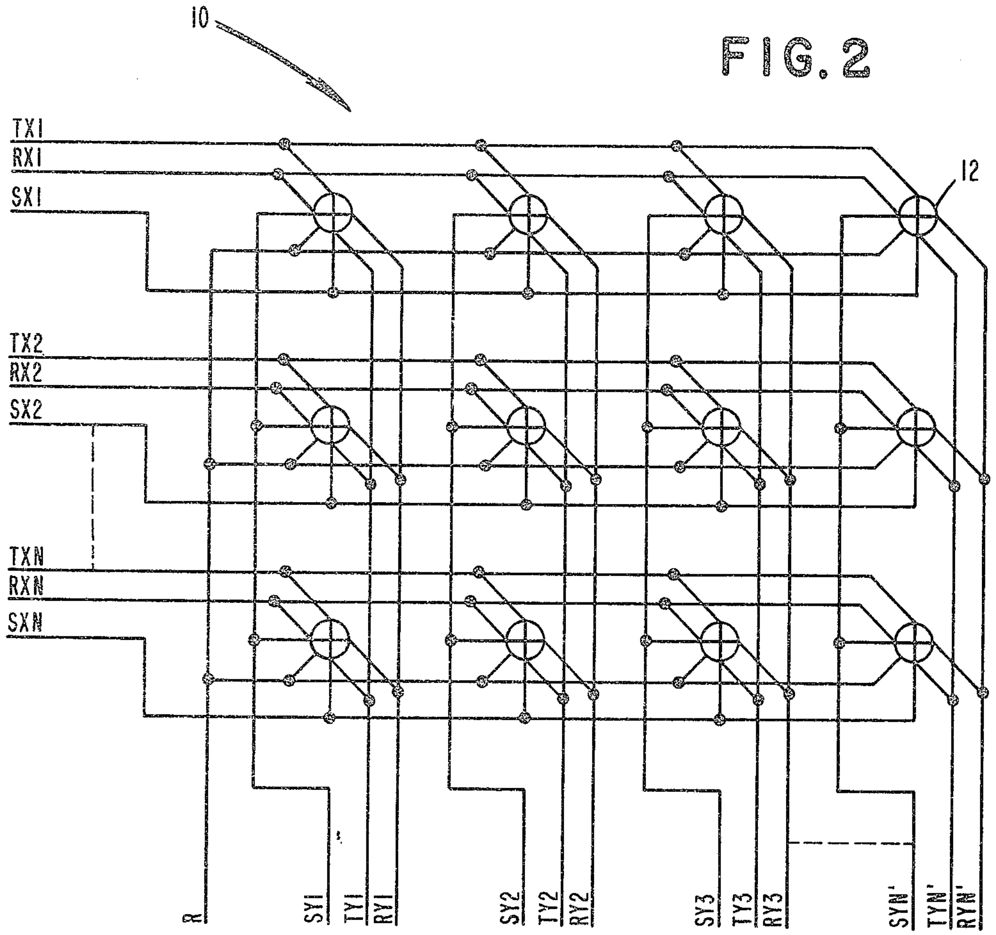
FIG. 2 is a schematic diagram of a portion of a switching matrix utilizing an array of solid state cross point switches as provided in the system of FIG. 1.

FIG. 2 provides a detailed illustration of a portion of the matrix 10 made up of an array of solid state cross point switches 12 wherein each individual switch 12 interconnects a particular pair of horizontal tip and ring leads TX and RX, respectively with a particular pair of vertical tip and ring leads TY and RY, respectively. In normal operation, each cross point switch 12 provides a high impedance path between the horizontal and vertical lead pair it interconnects, thereby effectively blocking the passage of any audio signal and d.c. current flow therethrough. When it is desired to pass an audio signal between a particular horizontal lead pair TX and RX and a particular vertical lead pair TY and RY, respectively, the appropriate cross point switch 12 is selectively enabled by simultaneously applying appropriate control signals on lead R and to a horizontal control lead SX and a vertical control lead SY, which are uniquely associated with that particular cross point switch 12 chosen for operation.

Each horizontal lead pair TX and RX has an individual horizontal control lead SX associated therewith, and each vertical lead pair TY and RY has an individual vertical control lead SY associated therewith. Consequently, any cross point switch 12 can be selectively enabled by applying control signals to the horizontal and vertical control leads uniquely associated with the particular switch. Each of the control signals consists of a single momentary pulse which once applied on the horizontal and vertical control leads SX and SY, respectively, together with a signal on lead R actuates the switch 12 and is thereafter removed leaving the switch 12 in a low impedance state. When it is desired to restore the high impedance connection, the switch 12 is disabled by applying the same control signals to the same horizontal and vertical control leads SX and SY, respectively, but without a signal on lead R which is connected to all the cross point switches 12.

Figure 3:
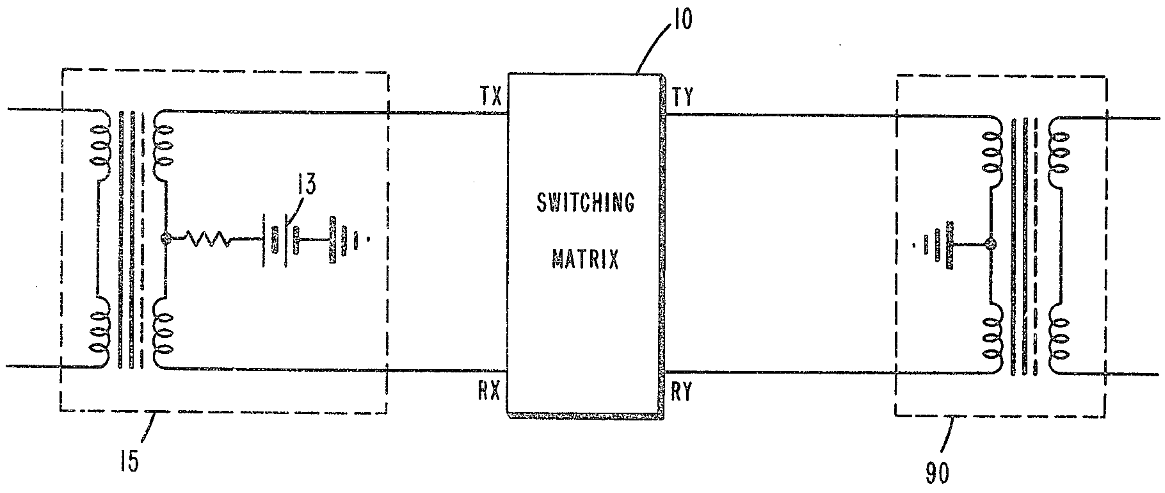
FIG. 3 is a schematic diagram illustrating a single tip and ring line connection to the switching matrix.

The switching matrix 10 is used solely for establishing an audio path between subscribers via the tip and ring leads. The typical tip and ring lead interconnection through the matrix is illustrated in FIG. 3, wherein the tip leads TX and TY and the ring leads RX and RY are interconnected in a single connection including balanced transformer bridges onto which audio signals are transposed. Direct current power is supplied from a battery 13 connected between the center tap of the windings of the transformer bridge in the line circuit 15, for example, and ground connected to the center tap of the transformer in the junctor circuit 90, for example. This basic type of interconnection and biasing arrangement is well known in the art.

A. already indicated, the matrix 10 is designed to carry only the audio communication between lines or between a line and a trunk. The signaling associated with the establishment of the communication connection through the matrix 10 is handled outside of the matrix via a common bus 32 through a class of service programmer 47 connected to the common control equipment 100.

FIG. 1$b$ schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning line conditions and other information from the junctor and perform memory timing functions within the system. For example, on-hook and off-hook timing, timeouts, flash detection and other conventional timing functions are performed by the timer 120. In this regard, the timer 120 operates with the control circuits 110 to perform whatever timing functions are necessary within the system.

A class of service buffer 125 forms an interface between the class of service programmer 47 and the logic circuitry of the common control 100. Thus, the various line conditions which are derived through the class of service programmer 47 each time a line is addressed will be passed to the control circuits 110 through the class of service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class of service programmer 47 to the control circuits 110 in the common control 100 via the class of service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of the communication connection between parties and in providing various functions requested by the parties during the call, it is necessary at various times to temporarily store information as functions are being performed within the system by the common control 100. The hold register 135 provides the temporary storage capability in the system.

The system includes a junctor memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of those lines which are stored therein. In this way, the identity of the cross points in the matrix 10 associated with the line or lines involved with the junctor can be identified.

A line selector 155 receives line designations from the line scanner 130 and from the junctor memory 140, and in response to clock signals from the clock 115, selectively addresses cross points in the matrix 10 and selected lines at the proper times. As already indicated in connection with the description of the solid state cross point matrix 10, addressing alone of the cross point will open the cross point, while addressing in combination with a positive request for actuation of the cross point will close the cross point. Whether or not the cross point is to be opened or closed is determined by the status of the call based upon the progress of the connection as determined by the control circuits 110 from the information derived from the lines via the class of service programmer 47 and class of service buffer 125.

The system control progresses in states, with the individual states being monitored by the status circuit 160, which stores the state in which any particular call is in and advances under control of the control circuits 110 as the call progresses from one state to the next in a particular program. Thus, the information concerning the desired condition of the cross point, i.e., whether it is to be open or closed, is derived from the status circuit 160. If the cross point which is addressed from the line selector 155 is to be closed for a particular call, a matrix control 165 will receive information from the status circuit 160 to this effect and generate a positive request signal for closing of the cross points. If the cross points are not to be closed, the matrix control 165 will produce no output as the cross points are addressed, thereby effecting an automatic opening of the cross points.

A ringing generator 195 of any known form is provided for application of ringing current to the lines under control of the control circuits 110. While the ringing generator is in itself a conventional circuit, the application of ringing to the line in the system of the present invention is somewhat different in view of the multiplex addressing of the various lines by the common control. Thus, the output of the ringing generator 195 may be connected simultaneously to all lines since the lines are addressed in turn during the scanning of the junctors associated therewith. In this way, ths the system requires only a single ringing generator, thereby materially simplifying system and reducing the costs thereof.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

A further special feature of the present invention is embodied in a call pickup arrangement including a call pickup circuit 175 and a plurality of call pickup displays 180*a* through 180*n*. In accordance with this special feature of the present invention, a party may respond to a call to another party identified on the call pickup display.

The function of the various elements of the system of the present invention will become clearer from a general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class of service programmer 47 along with class of service information concerning that line circuit to the common control 100. Assuming that the line circuit 15a has gone offhook and is requesting service, this line will ultimately be addressed by the line selector when the line scanner 130 reaches this line in its scan of all of the lines. At the same time, the line selector 155 will also address all of the cross points of the matrix 110 associated with that line circuit. In this case, all of the cross points associated with the line circuit 15*a* along the first horizontal of the matrix including the cross point 12′ will be addressed. If, as a result of some misoperation, one or more of these cross points has been inadvertenly closed, the addressing of the cross points at this time will automatically open the cross points in the absence of positive control from the matrix control 165 indicating that one or more of these cross points should be closed. Since line 15*a* has just requested service, none of the cross points should be closed and therefore the status circuit 160 will provide no indication to the matrix control 165 that any of the cross points involved should be closed. In view of the fast scanning times provided within the system for scanning the lines and junctors, it can be seen that a misoperation of a cross point will be immediately corrected so that no effect upon any communication connection through the matrix will result, nor will such cross point misoperation be noticeable to either party except for a click as the cross point is opened or closed to correct the state thereof. Further details concerning the unique operation of the matrix under control of the line scanner 130, line selector 155 and matrix control 165 are disclosed in our copending application Ser. No. 431,878, filed Jan. 9, 1974, which application is assigned to the same assignee as the present application.

When the control circuit 110 receives an indication through the class of service buffer 125 that the line circuit 15a has requested service, the control circuits 110, which include a junctor allotter, will assign a free junctor to the line circuit and request that the calling line number of the line circuit 15*a* be stored in the junctor memory 140 in the time positioned assigned to the selected junctor. The control circuits 110 will also address the status circuit 160 to record in the memory thereof that the call associated with the selected junctor is in the first state of operation. Assuming that the junctor allotter in the control circuits 110 selects the local junctor 95*a*, the calling line number of the line circuit 15*a* will be stored in the memory position of the junctor memory 140 permanently assigned to the local junctor 95*a*, and each time the junctors are scanned, the line number of the calling line 15*a* will be forwarded to the line selector so that the line 15*a* can be addressed at this time and the cross point associated both with the line 15*a* and the junctor 95*a*, i.e., the cross point 12′, can be addressed. The status circuit 160 indicates to the matrix control 165 that the call is in a state wherein the cross point 12′ should be closed, and therefore the matrix control 165 will forward a positive request for closing the cross point 12′ at the time the cross point is addressed. As a result, the line circuit 15*a* will be connected through the matrix 10 to the local junctor 95*a*.

At the same time that the cross point 12′ is addressed and closed to enable connection between the line circuit 15*a* and the local junctor 95*a*, the matrix control 165 under control of the status circuit 160 addresses the cross points of the tone matrix section of the matrix 10 associated with the dial tone generator 68 so that the cross point 12‴ will be closed connecting the dial tone generator 68 through the local junctor 95*a* to the line circuit 15*a*. The line circuit may then commence to dial the number of the party to which it desires connection.

The control circuits 110 in the common control 100 will advance the status circuit 160 for the particular junctor 95*a* to state 2 if the calling line circuit has rotary dial equipment or to state 3 if the calling line has tone dial equipment, as determined from the class of service information for that line circuit received from the class of service programmer 47. Each time the junctor 95*a* is scanned, the number of the calline line circuit 15*a* will be provided by the junctor memory 140 to the line selector 155 which will address the line permitting the calling bridge relay state to be monitored via the bus 32 and class of service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95a both the calling and the called line numbers.

When it is determined by the timer 120 that the calling line 15*a* has completed dialing, the control circuits 110 will advance the status circuit 160 to record state 4 in the position of the memory thereof assigned to the junctor 95*a*. State 4 relates to busy test of the called line circuit. If the called line circuit is found to be busy, the tone matrix section of the matrix 10 is once again addressed from the matrix control 165 to connect busy tone from the generator 68 through the local junctor 95*a* to the calling line circuit 15*a*. On the other hand, if the called line circuit is free, the control circuits 110 will advance the status recorded in the status circuit 160 to state 5 for application of ringing from the ringing generator 195 to the called line circuit and to address the tone matrix section of the matrix 10 to connect the ring back tone generator 78 through the local junctor 95*a* to the calling line circuit 15*a*.

The matrix control 165, upon receiving the calling and called line numbers from the junctor memory 140 as the junctor 95*a* is scanned, will address the cross point 12′ and also the cross point associated with the called line, for example, cross point 12″ associated with the line 35*a*. Thus, when the called party answers in response to the applied ringing, he will be connected via cross points 12′ and 12″ in the matrix 10 to the calling party. At this time, the status circuit 160 is advanced by the control circuits 110 to status 7, indicating to the system that a local call is in progress.

Where the lines are equipped with tone dial equipment, this class of service for the line circuit is indicated to the common control by the class of service programmer 47. In this regard, the class of service programmer 47 typically includes a panel having selected class of service plugs so that the features of the system may be allocated on a per line basis and the information with respect thereto may be provided to the common control. Thus, in addition to providing a path for the calling bridge relay information from the lines, the class of service programmer 47 also submits at this time class of service data concerning the particular line for use by the common control 100.

When a call in in state 3 indicating dialing from tone dial equipment, the common control 100 effects connection between the calling line and an available one of the tone receivers 40*a* via the matrix 10 through 40*n*. The tone receiver converts the tone dial to binary numbers, which may then be received by the common control 100.

Since the operator loop circuits 60*a* through 60*n* are merely provided as line appearances at the input of the matrix 10, the functions associated with the operator position are greatly simplified. Because of the fast switching capability of the cross points in the matrix 10, the spit functions normally associated with incoming connections to the operator may be performed with the matrix cross points. Thus, special trunk circuits having separate operator access with split tip and ring pairs, as normally required in conventional systems, are not required in the system of the present invention. In addition, since the split functions are performed in the present system within the matrix 10 by selective operation of the cross points, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the junctor controls the cross points for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex are not required. The junctor circuit once again takes care of the duties normally provided in this regard. In addition, due to the elimination of information trunk hardware, tandem operation for operator extended calls to trunks between information trunks and the central office trunks is not required. The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to a local junctor upon detection of the request for service in the manner described above by closing the cross point in the matrix 10 common to the line circuit and a selected available local junctor. In the foregoing example, by closing cross point 12', the line circuit 15*a* can be connected to the local junctor 95*a*. An addressing of the tone matrix section provides connection of the dial tone generator 68 through cross point 12''' and the local junctor 95*a* to the line circuit 15*a*. When dialing commences, the cross point 12''' is released disconnecting dial tone from the line circuit and the dialing impulses are received in the common control 100 via the class of service programmer 47. The digit decoder 150 for outgoing trunk calls will recognize the first digit as a request for access to a trunk circuit and the control circuits 110 will advance the status circuit 160 for the junctor 95 *a* to a state 12, indicating need to connect to a trunk junctor. The junctor allotter in the control circuits 110 will select an available trunk junctor, for example, junctor 85*a* connected to the trunk 89*n*.

As can be seen, with the arrangement of the present invention, many different functions can be performed during the time in which a junctor is being scanned through selective control of various cross points within the matrix 10 under control of the common control 100 during designated time slots of the junctor scan period, as will be described in greater detail in connection with the system timing.

SYSTEM TIMING

Figure 4C:
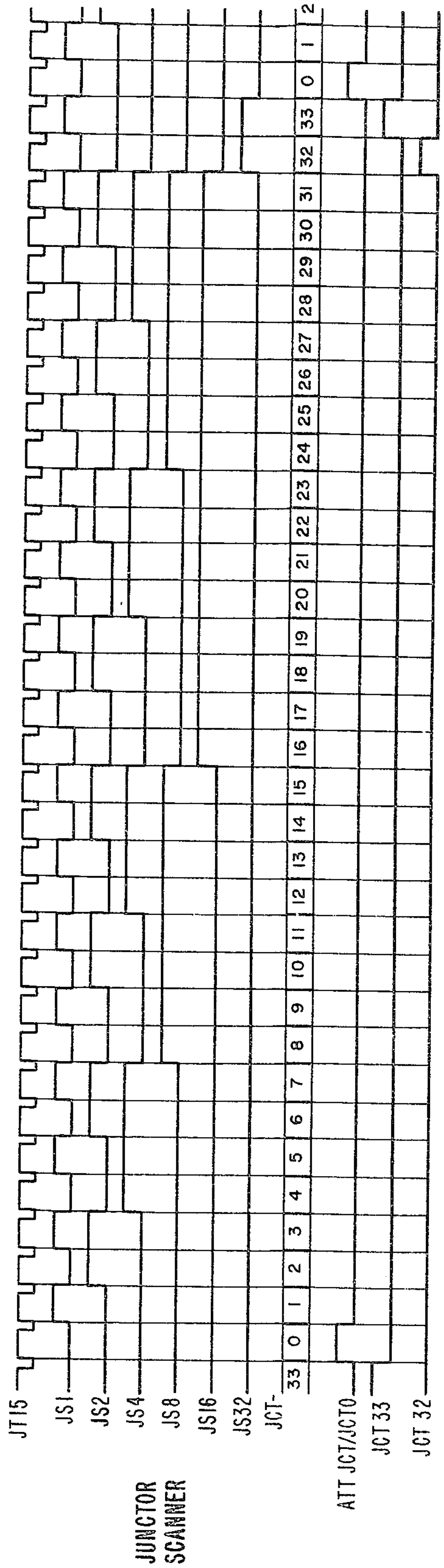
FIGS. 4A through 4C are waveform diagrams of clock signals which are used to control the timing of functions within the system.
Figure 4A:
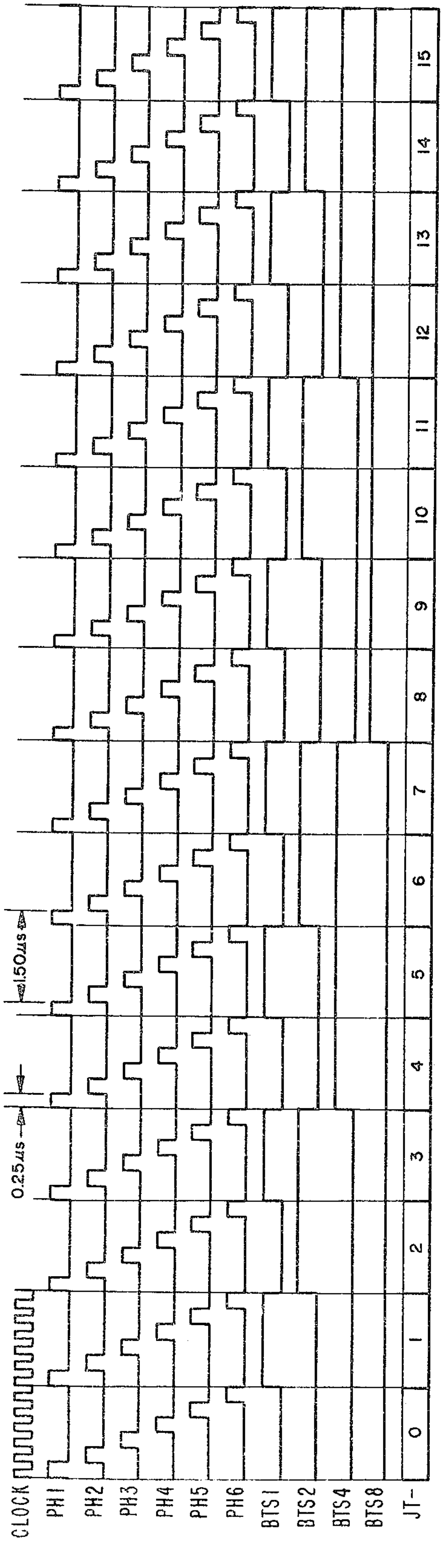
Figure 4B:
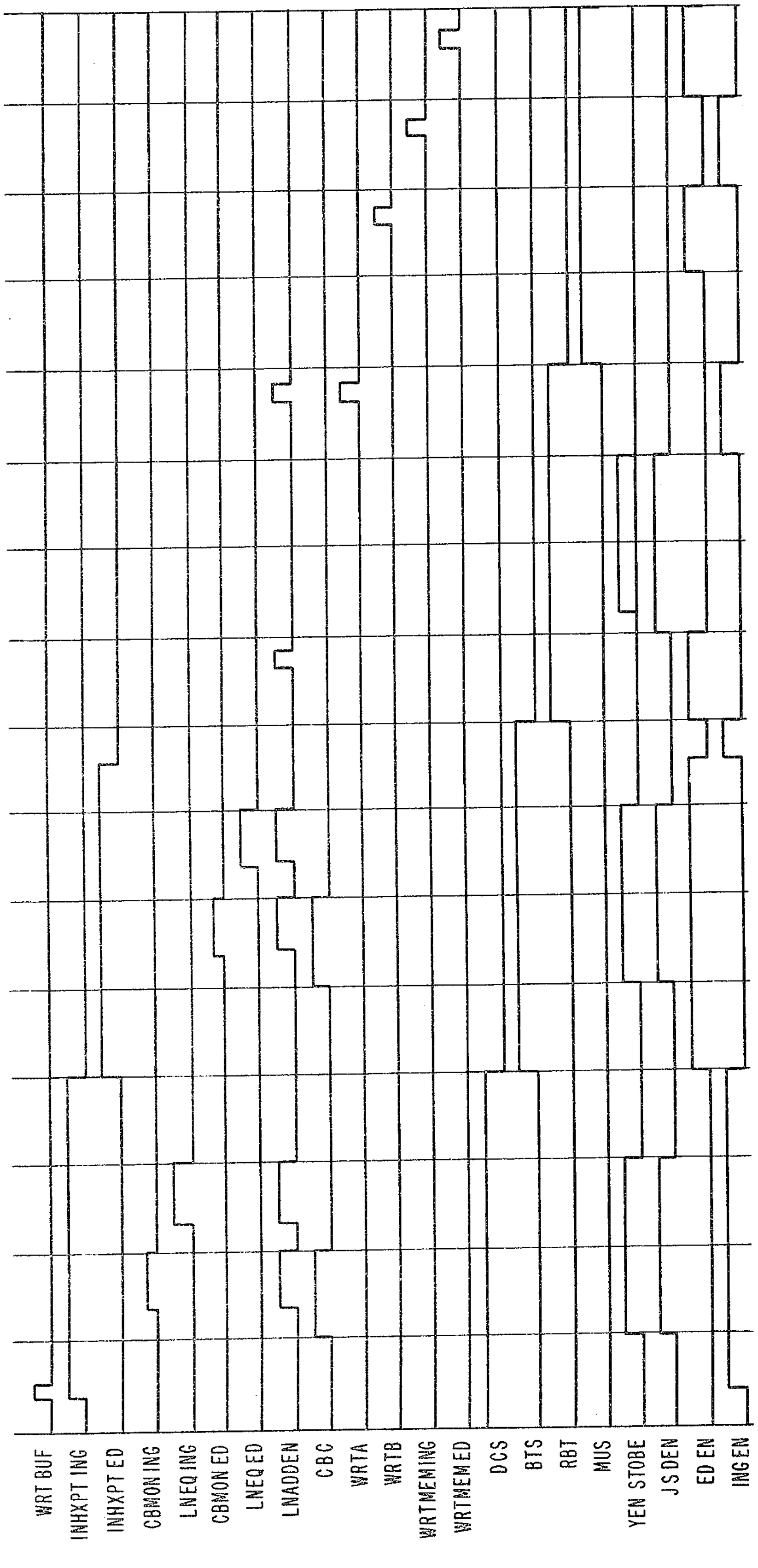

The system timing is controlled by the clock 115 in the common control 100 on the basis of various clock signals such as presented in FIGS. 4A through 4C. Typically, the clock includes a 4MHz crystal oscillator connected to a divider chain and various decoders to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the preferred embodiment disclosed in this application, thirty-two junctors are connected to the output of the matrix 10, so that the junctor memory 140 will include thirty-two junctor positions. In addition, the junctor memory 140 also includes positions 32 and 33 which represesnt time periods during which a scanning of the lines is effected. Thus, after all junctors have been scanned, the line number designated by the line scanner 130 will be addressed during the thirty-two and thirty-three junctor positions to determine whether there is a request for service in connection with that line. Thus, at the end of each 32 time position, the line scanner 130 will be advanced to the next line, with the result that the lines are scanned one at a time at the end of each complete scan of the junctors.

Each junctor time position is subdivided into junctor time slots during which the various functions required in connection with the call associated with the junctor performed under control of the control circuit 100. During one or more of the time slots of each junctor time one or more functions may be performed by various elements of the common control as required by the state of the call under control of the control circuits.

The clock 115 is typically formed by a crystal oscillator connected to a divider chain and various decoders to produce the clock signals required for controlling the functions to be performed within the system. FIG. *4a* illustrates the output of a 4 MHz crystal oscillator from which phase signals PH1 through PH6 are derived by a clock phase generator producing a division by six of the basic frequency. The output of the clock phase generator is connected to a bit time slot counter effecting a division by sixteen to produce the binary four bit time slot signals BTS1 through BTS8. A decoding of the binary bit time slot signals produces the sixteen junctor time slot signals JT0 through JT15.

Further decoding of the binary bit time slot signals BTS1 — BTS8 also produces various timing signals which are utilized throughout the system. These timing signals which will be utilized in the various common control circuits to be described are illustrated in FIG. *4b* in relation to the sixteen junctor time slot signals JT0 through JT15. The function of these timing signals will be described in connection with the description of the detailed operation of the various common control elements.

FIG. 4C illustrates the waveforms which are derived from the junctor scanner portion of the clock. A further division by thirty-four of the binary bit time slot signals BTS1 BTS8 produces the junctor scan signals JS1 through JS32. A decoding of these junctor scan signals then produces the junctor signals JCT0 through JCT33. Additional decoding produces the signal ATT JCT which represents the junctor 0 position as well as the junctor 32 and junctor 33 signals JCT32 and JCT33.

THE JUNCTOR CIRCUIT

Figure 5:
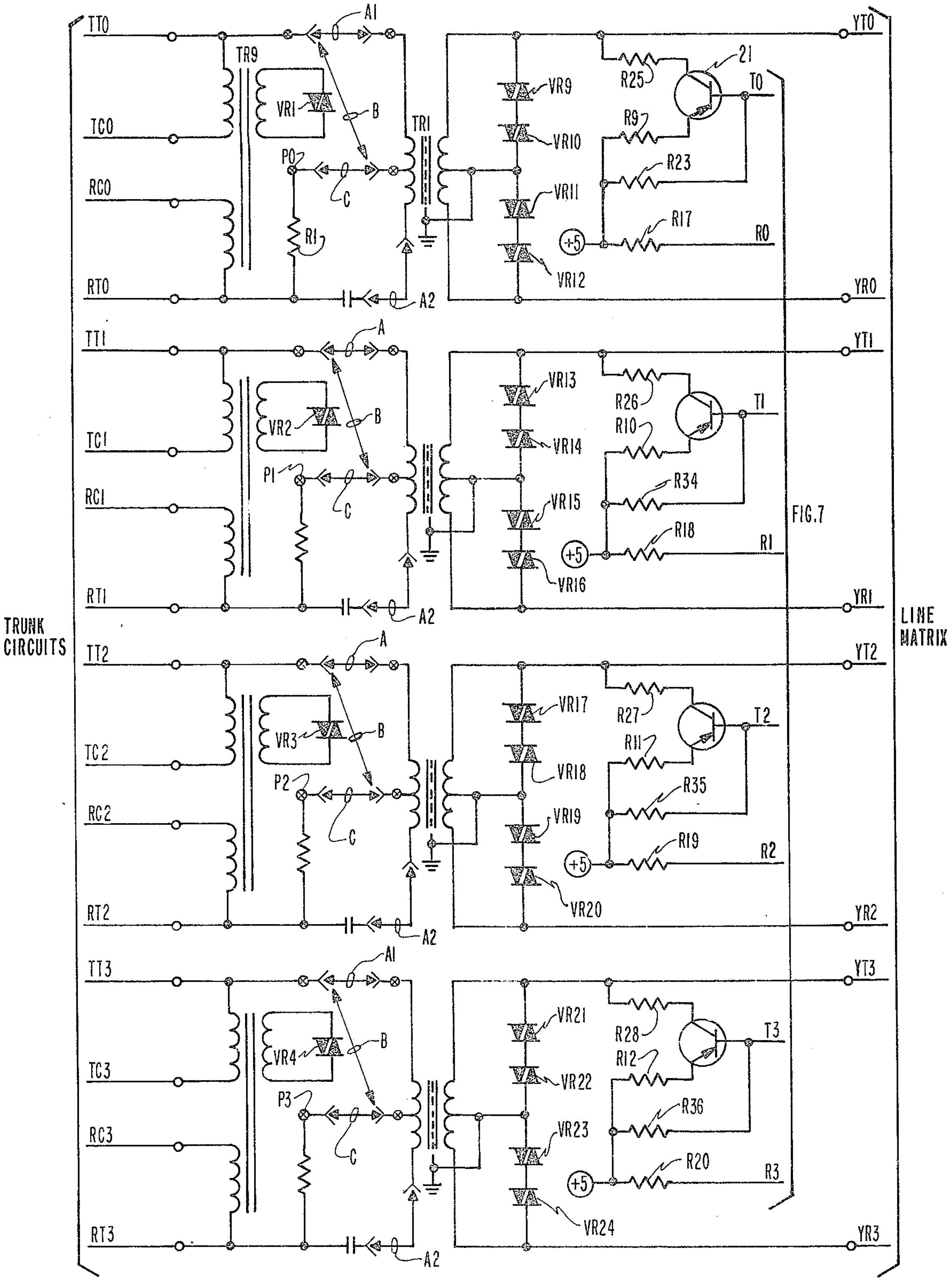
FIG. 5 is a schematic diagram of a plurality of junctor circuits.

FIG. 5 illustrates an example of a junctor circuit which may be modified by suitable strapping to serve as a local junctor or a trunk junctor. The heart of the junctor circuit is formed by a transformer bridge TR1, which serves to complete the battery connection in the manner described with respect to FIG. 3. The center tap of the secondary winding of the transformer TR1 is connected to a ground while the respective ends of the secondary windings are connected to the tip and ring leads YT0 and YR0 extending to the service portion of the switching matrix 10.

A tone coupler including a transistor 21 and resistors R25, R9, R33 and R17 serve to connect tones from the tone matrix to the tip lead YT0 extending to the service portion of the matrix 10. While the tone coupler connects the tones to just one side of the balanced audio path, it should be obvious that the addition of another transistor corresponding to transistor 21 and controlled from the lead R0 from the tone matrix will provide a balanced coupling which should even further eliminate any further possibility of residual turn-on transients.

For purposes of a local junctor, only the circuitry connected to the secondary of the transformer TR1 is required, and therefore, for this purpose, the A straps connected to either side of the primary widing of the transformer TR1 may be removed. However, if the junctor is to function as a trunk junctor, the primary of the transformer TR1 will be connected to a trunk circuit via the leads TTO and RTO via the straps A. This arrangement will provide the proper impedance match with the normally provided 900 ohm trunk circuit. By removing the strap A1 and adding the strap B, the circuit may be converted for a use with the 600 ohm trunk. A further modification of the junctor for use as a local junctor providing 5DB attenuation may be accomplished by removing the straps A1 and B, as well as the strap B, and by inserting the straps A2 and C between the center tap of the primary winding and the terminal P0 to which a resistor R1 is connected from the lead RTO.

The junctor circuit provides three stages of protection for transients and current surges. The first stage of protection is provided by a transformer TR9 having a pair of primary windings connected to the leads TTO, TCO and RCO, RTO, respectively. The secondary winding is connected to a diode element VR1. The second stage of protection in the junctor is provided by the transmission bridge TR1. The third stage of protection is provided by the rectifier arrangement connected across the secondary winding of the transmission bridge TR1 and formed by the diode elements VR9, VR10, VR11, and VR12.

It will be seen from FIG. 5 that the junctor circuits are of substantially identical configuration from the point of view of association with the tone matrix. The only changes which may be made from one junctor to the next is the particular strap connections which serve to modify the junctors for use as local junctors or trunk junctors having a various impedance and attenuation levels. Thus, while only a single junctor circuit has been described, it should be apparent that the same features apply to the other junctor circuits.

THE TONE MATRIX

Figure 7:
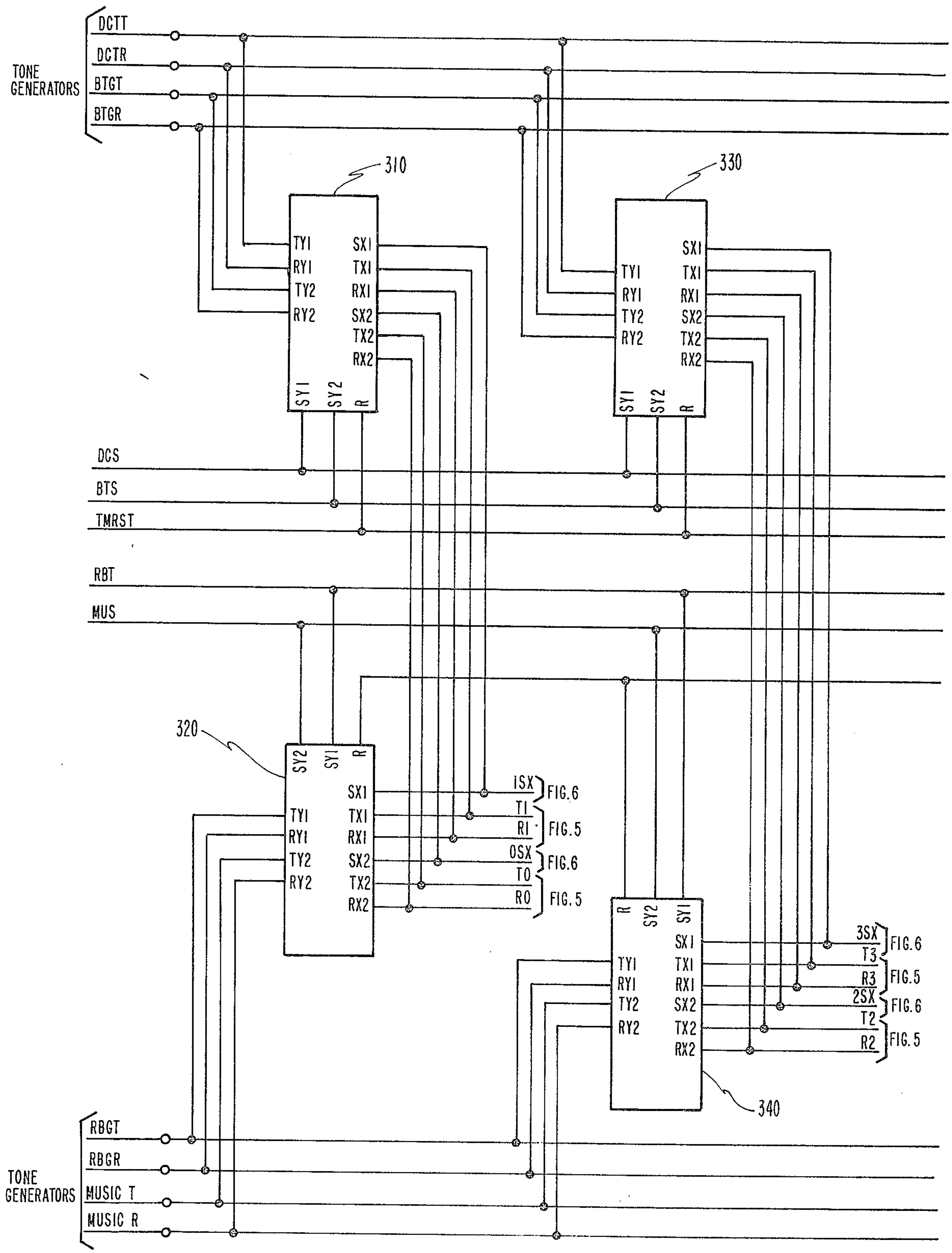
FIG. 7 is a schematic diagram of a portion of the tone matrix.

FIG. 7 illustrates a portion of the tone matrix including switch pairs 310, 320, 330 and 340, each representing a pair of cross point switches. The tone matrix is illustrated in FIG. 1 as including four horizontal lines connected respectively to a dial tone source, a ring-back tone source, a music source and a busy and camp-on source. Certainly, additional horizontal lines can be provided to switch in tones of different levels or frequencies; however, the four line system facilitates the description of the novel features of the present invention.

Referring to FIG. 7, the first horizontal is connected to a dial tone source providing a dial tone signal on the tip and ring leads DCTT and DCTR to the inputs TY1 and RY1 of the switch pairs 310 and 330. The second horizontal is connected to a source of busy tone provided on the tip and ring leads BTGT and BTGR to the inputs TY2 and RY2 of the switch pairs 310 and 330. The third horizontal of the tone matrix is connected to a ring-back tone generator which provides ring-back tone on the tip and ring leads RBGT and RBGR to the inputs TY1 and RY1 of the switch pairs 320 and 340. The fourth horizontal provides music on tip and ring leads MUSIC T and MUSIC R to the inputs TY2 and RY2 of the switch pairs 320 and 340. The provision of music along with other tones is utilized for application to a line circuit which may be on hold or in a camp-on condition.

The outputs of the switch pairs on leads TX1, RX1, TX2 and RX2 are connected to the respective tip and ring lead inputs to the tone couplers of the respective junctor circuits. For example, the tip and ring outputs TX1 and RX1 from the switch pairs 310 is connected to the tip and ring lead inputs T1 and R1 of the second junctor circuit illustrated in FIG. 5. The tip and ring outputs TX2 and RX2 of the switch pair 310 are connected to the tip and ring inputs IO and RO of the tone coupler associated with the first junctor illustrated in FIG. 5.

The control inputs SX1 and SX2 of each switch pair must be enabled and the TMRST lead must be high in order to effect connection with the associated tip and ring outputs TX1, RX1, and TX2, RX2 associated therewith. Also, whether the inputs TY1, RY1 are connected to the outputs TX1, RX1 or to the outputs TX2, RX2 depends upon whether the control input SY1 or the control input SY2 is enabled. Thus, the control inputs SX1 and SX2 of each switch pair in combination with the control inputs SY1 and SY2 and the TMRST lead determine which input is to be connected to which output.

Figure 6:
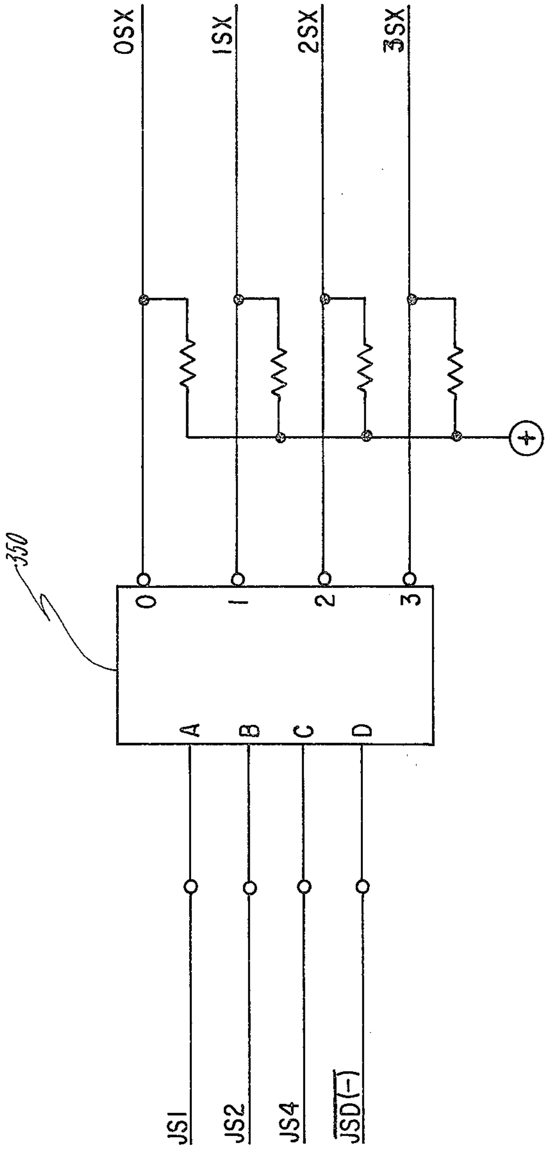
FIG. 6 is a schematic diagram of a decoder circuit.

FIG. 6 illustrates a decoder arrangement including the decoder 350 which receives the binary junctor time slot signals JS1, JS2, JS4 snd $\overline{\text{JSD}(-)}$ and enables one or none of the outputs OSX through 3SX depending upon the binary combination received on the clock inputs. Thus, the signals OSX-3SX represent the junctor times for junctors 0–3 and serve to scan the cross points in the tone matrix in synchronism with the scan of the junctors by the common control. In other words, during each respective junctor time, the cross points in the tone matrix associated with that particular junctor will be enabled from the clock signals provided at the output of the decoder 350.

Referring to FIG. 4B, it will be seen that the clock circuit generates control signals DCS, BTS, RBT and MUS during junctor time slots JT0-JT3, JT4-JT7, JT8-JT11, and JT12-JT15. Thus, during each junctor time is divided by the clock into four successive time periods for controlling dial tone, busy tone, ring-back tone and music. For example, during time slots o–3, the signal DCS will be generated permitting connection of the inputs TY1 and RY1 to the outputs TX1, RX1 and TX2, RX2. In other words, during the time when signal DCS is generated, the dial tone generator will be connected from tip and ring leads TY1, RY1 to either TX1, RX1 or TX2, RX2 depending upon whether SX1 or SX2 is enabled and upon the level of TMRST. During junctor time slots 8–11, the clock will generate the signal RBT, which is applied to the switch pair 320 and 340 to permit inputs TY1, RY1 to be connected either to outputs TX1, RX1 or TX2, RX2 depending upon whether SX1 or SX2 is enabled and upon the level of TMRST. When TMRST is low, the selected cross point will be reset until updated at the next scan of the associated junctor.

The foregoing description of the application of the signals DCS, BTS, RBT and MUS to the switch pairs 310–340 along with the junctor time signals OSX – 3SX relates to the continuous addressing of all of the cross points of the tone matrix from signals generated by the clock circuit. From this description it will be apparent that as each junctor is scanned by the common control, the four cross points in the tone matrix associated with each particular junctor are addressed in sequence. However, as already described in connection with FIG. 2, mere addressing of the cross points serves to ensure that the cross point is open in absence of a corresponding control signal applied to the R input of the cross point switch. To close a cross point which is being addressed in the tone matrix, the matrix control applies a signal TMRST to the R input of all of the switch pairs 310–340, premitting the single cross point which is being addressed at that time to close. As described more particularly in applicants' copending U.S. Application Ser. No. 431,878, filed Jan. 9, 1974, which is directed to control over matrix operation, the continuous scanning of all of the cross points of the tone matrix as the junctors are continuously scanned by the common control ensures that only those cross points which are to be closed remain closed for more than the time period of one scan of all of the junctors. Since the scan of the junctors by the common control is extremely fast, no cross point will be improperly closed for any significant length of time which may be apparent to a subscriber.

Figure 8:
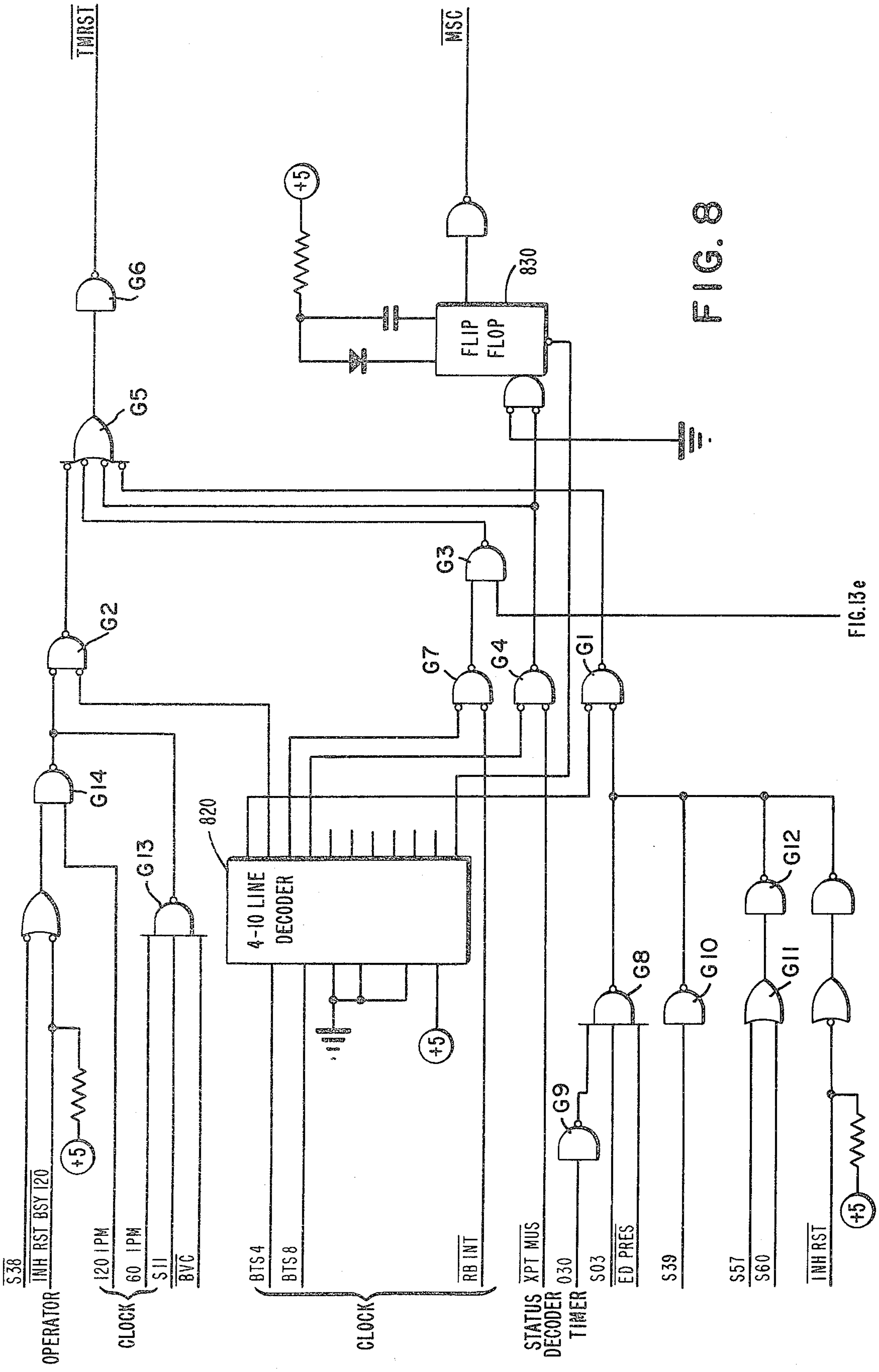
FIG. 8 is a schematic diagram of a portion of the matrix control circuit.

The portion of the matrix control which is responsible for generating the control signal TMRST is illustrated in FIG. 8. The signal TMRST may be generated during any one of four distinct time periods from the outputs of gates G1 - G4 via gates G5 and G6. The gates G1-G4 are enabled in sequence from the four outputs of a decoder 375 which receives a pair of clock inputs BTS4 and BTS8, which are generated by the clock to form the junctor time slot signals, as seen in FIG. 4*a*. Thus, during junctor time slots JT0-JT3, the gate G1 will be enabled from the output of the decoder 375, during junctor time slots JT4-JT7, the gate G2 will be enabled from the output of the decoder 375, during junctor time slots JT8-JT11, gate G3 will be enabled via gate G7 from the output of the decoder 375, and during junctor time slots JT12-JT15 the gate G4 will be enabled from the output of the decoder 375.

Gate G1 provides an output which enables generation of the signal TMRST when dial tone is to be applied through the tone matrix. The most frequent condition enabling gate G1 will result from the output from gate G8 generated by a signal S03 from the status circuit indicating the initial operations involved in the establishment of a call along with an indication from the digit decoder that the called party is not present represented by the signal $\overline{\text{ED PRES}}$. Upon receipt of the timing signal 030 from the timer via gate G9, the gate G8 will be enabled to enable gate G1 from the output of the decoder 375. Various other states requiring dial tone can also be made to generate the signal TMRST by similar application of status control signals from the status circuit to enable gate G1.

An inhibiting of the gate G1 may also be effected under certain conditions. For example, during state 39 relating to campon, the generation of dial tone is inhibited by the output from gate G10 upon receipt of the status signal S39 from the status circuit. Similarly, either of the call waiting states S57 or S60 will result in inhibiting of the gate G1 via gates G11 and G12.

Enabling of the gate G2 serves to generate the signal TMRST for application of busy tone through the tone matrix. This may be accomplished by an output from Gate G13 in response to a signal S11 from the status circuit indicating a busy status along with a signal $\overline{\text{BVC}}$ from the operator complex indicating that the condition is not an operator-busy condition. The gate G13 will then be pulsed by the sixty IPM signal from the timer thereby pulsing the gate G2 to provide a pulsed output signal TMRST. Thus, the cross point associated with the junctor to receive busy tone will be sequentially opened and closed to provide an interrupt busy tone signal. Under these circumstances, it will be seen that no special interrupter circuit is necessary to provide an interrupted busy tone signal, this being accomplished by a pulsing of the cross points in the tone matrix.

A trunk busy condition is monitored by the gate G14, which receives a signal S38 from the status circuit indicating a trunk busy status and is then pulsed by the 120 IMP signal from the timer. Under these circumstances, the signal TMRST is pulsed at a rate of 120 impulses per minute so as to pulse the cross point in the matrix providing an interrupted busy tone to the line circuit.

The gate G3 controls the generation of the signal TMRST for application of ring-back tone through the tone matrix. Various states of the system require the application of ring-back tone, which states are controlled by the signal ARSL 1 applied to the gate G3. The gate is then pulsed from the output of gate G7 which receives the ring-back interrupter signal $\overline{\text{RB INT}}$.

The gate G4 controls the generation of the signal TMRST for the application of music through the tone matrix. The status decorder provides a signal $\overline{\text{XPT MUS}}$ to the gate G4 to provide an output through the gates G5 and G6 to the tone matrix. The output from the gate G4 is also applied to the music source control 830 which provides an output signal MSC to enable the music source.

It will be seen from the foregoing description that the use of a tone matrix provides a unique control over the application of tone signals and music to the various lines in the system, greatly simplifying the overall construction of the system and providing for a more rapid control over the application of these signals. In addition, coding by interruption rate or duty cycle of a given tone does not affect the tone matrix design, since the control of the cross points of the matrix is derived from the common control. Since each junctor has its own tone access to the matrix, all tones are immediately available to every talking path.

While We have shown and described one embodiment in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What is claimed is:

1. In an electronic telephone system including a plurality of line circuits, a plurality of junctor circuits, a first switching matrix connected to said line circuits and said junctor circuits and common control means for controlling said switching matrix to connect a line circuit to a junctor circuit and to another line circuit, tone supplying means for applying a selected one of a plurality of tones to said line circuits comprising a plurality of tone generators and a second switching matrix connected to said tone generators and said junctor circuits for selectively connecting a tone generator through a junctor circuit and said first switching matrix to a selected line circuit under control of said common control means, said second switching matrix including first and second sets of coordinate lines interconnected at their cross points by respective matrix switches, said tone generators being connected to respective ones of said first set of lines and said junctor circuits being connected to respective ones of said second set of lines, said common control means including clock means for sequentially enabling each switch of the group of matrix switches of said second switching matrix associated with each junctor so as to scan each group of switches in the order of said junctor circuits.

2. The system defined in claim 1, wherein said second switching matrix is formed as a solid state matrix of transistor cross point switches each actuated in response to an enabling signal and an operating signal and reset in response to only an enabling signal.

3. The system defined in claim 2, wherein said common control means further includes status control means responsive to the condition of said line circuits and signals received therefrom for determining which line circuits are to be connected to said tone generators, and matrix control means responsive to said clock means and said status control means for applying an operating signal to all of said matrix switches of said second switching matrix at the time a selected switch associated with a particular junctor and a selected tone generator is enabled by said clock means.

4. In an electronic telephone system including a plurality of line circuits, a plurality of junctor circuits, a first switching matrix connected to said line circuits and said junctor circuits and common control means for controlling said switching matrix to connect a line circuit to a junctor circuit and to another line circuit, tone supplying means for applying a selected one of a plurality of tones to said line circuits comprising a plurality of tone generators and a second switching matrix connected to said tone generators and said junctor circuits for selectively connecting a tone generator through a junctor circuit and said first switching matrix to a selected line circuit under control of said common control means, said second switching matrix being formed as a solid state matrix of transistor cross point switches each actuated in response to an enabling signal and an operating signal and reset in response to only an enabling signal.

5. The system defined in claim 4, wherein said first matrix is formed as a solid state matrix of transistor cross point switches.

6. The system defined in claim 4, wherein said second switching matrix is coupled to said first switching matrix by an attenuating network which includes a solid state switch which substantially eliminates signal loss when said second switching matrix is in an unoperated condition.

7. The system defined in claim 4, wherein said common control means includes clock means for applying an enabling signal to the cross point switches of said second switching matrix so as to sequentially scan each switch of the group of switches associated with each junctor and to scan each group of switches in the order of said junctors.

8. The system defined in claim 7, wherein said common control means further includes status control means responsive to the condition of said line circuits and signals received therefrom for determining which line circuits are to be connected to said tone generators.

9. The system defined in claim 8, wherein said common control means further includes matrix control means responsive to said clock means and said status control means for applying operating signals to said cross point switches of said second switching matrix in coincidence with the application of enabling signals thereto from said clock means.

10. The system defined in claim 9, wherein said first matrix is formed as a solid state matrix of transistor cross point switches.

11. The system defined in claim 9, further including a source of music connected to said second switching matrix for applying a music signal to selected line circuits under control of said common control means.

12. The system defined in claim 9, wherein said matrix control means includes means for pulsing said operating signals to operate a selected cross point switch in a pulsed manner.

* * * * *